United States Patent [19]
Yanagi et al.

[11] Patent Number: 5,479,298
[45] Date of Patent: Dec. 26, 1995

[54] ND FILTER AND APERTURE DEVICE USING THE SAME

[75] Inventors: Michio Yanagi; Yoshio Kawakami; Hitoshi Nozue, all of Chichibu, Japan

[73] Assignee: Canon Denshi Kabushiki Kaisha, Japan

[21] Appl. No.: 302,946

[22] Filed: Sep. 8, 1994

Related U.S. Application Data

[63] Continuation of Ser. No. 992,105, Dec. 17, 1992, abandoned.

[30] Foreign Application Priority Data

| Dec. 20, 1991 | [JP] | Japan | 3-338595 |
| Sep. 17, 1992 | [JP] | Japan | 4-248030 |
| Dec. 3, 1992 | [JP] | Japan | 4-324241 |

[51] Int. Cl.$^6$ .................. G02B 5/22; G02B 5/20; G02B 1/10
[52] U.S. Cl. .................. 359/888; 359/889; 359/893; 359/233
[58] Field of Search .................. 359/888, 889, 359/894, 558, 562, 41, 43, 72

[56] References Cited

U.S. PATENT DOCUMENTS

| 2,244,507 | 6/1941 | Thomas | 359/888 |
| 2,356,694 | 8/1944 | Potter et al. | 359/888 |
| 3,149,968 | 9/1964 | Stephens | 359/888 |
| 3,488,118 | 1/1970 | Parrent et al. | 359/888 |
| 3,552,288 | 1/1971 | Corley | 359/888 |
| 3,669,540 | 6/1972 | Rattman et al. | 359/888 |
| 4,113,359 | 9/1978 | Koike et al. | 359/888 |
| 4,952,485 | 8/1990 | Shibahara et al. | 430/502 |
| 5,157,528 | 10/1992 | Clark et al. | 359/43 |

*Primary Examiner*—Paul M. Dzierzynski
*Assistant Examiner*—Audrey Y. Chang
*Attorney, Agent, or Firm*—Fitzpatrick, Cella, Harper & Scinto

[57] ABSTRACT

A plurality of darkness distributions having a predetermined relationship with a darkness distribution for ND-filtering transmission light at the position of an aperture blade in an aperture device are formed on an original. The original is photographed on a film by a camera, and after the film is developed, the film is molded to obtain a plurality of ND filters.

38 Claims, 10 Drawing Sheets

ND FILTER AND APERTURE DEVICE USING THE SAME

This application is a continuation of application Ser. No. 07/992,105 filed Dec. 17, 1992, now abandoned.

BACKGROUND OF THE INVENTION

1. Field of the Invention

The present invention relates to an aperture device suitably used in a photographing system, e.g., a video camera, a still video camera, or the like, a ND filter used therein, and a method of manufacturing the ND filter.

2. Related Background Art

An aperture device is arranged to control the amount of light incident on a silver chloride film or a solid-state imaging element such as a CCD, and when an object field is bright, the aperture device is stopped down to have a smaller aperture size. On a very fine day, or when a high-luminance object is to be photographed, the aperture device is stopped down to have a small aperture size, and is easily influenced by the hunting phenomenon of the aperture and diffraction of light, resulting in deterioration of the image. As a countermeasure against the deterioration, a film-like ND (neutral density) filter is attached to each aperture blade so as to increase the aperture size of the aperture device to some extent even when an object field is bright.

In recent years, the darkness of the ND filter is increased according to an increase in sensitivity of an imaging element so as to further decrease a transmission rate of light, so that a certain aperture size of the aperture device can be assured even when an object field is bright. However, when the darkness of the ND filter is increased, a difference between the amount of light t, which is transmitted through a ND filter 11, and the amount of light b which is not transmitted through the ND filter, is increased, and the resolving power is undesirably decreased, in a state shown in FIG. 7. In order to eliminate this drawback, the ND filter must have a structure wherein its darkness is changed so as to sequentially increase the transmission rate toward the center of the optical axis. Note that the present applicant proposed the ND filter having a structure wherein its darkness is changed so as to sequentially increase the transmission rate toward the center of the optical axis in Japanese Patent Application No. 4-77349.

Figure 7:
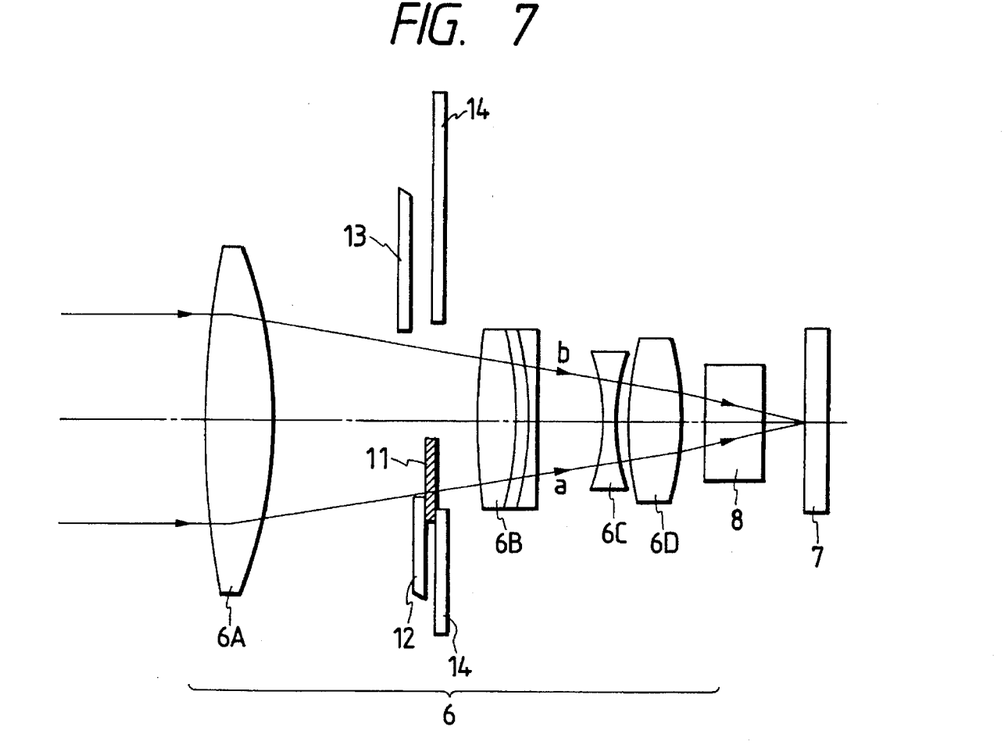
FIG. 7 is a sectional view showing an operation obtained when a conventional ND filter is arranged in a photographing system.

In FIG. 7, a photographing optical system 6 is constituted by lenses 6A, 6B, 6C, and 6D, and a solid-state imaging element 7 is arranged in front of a low-pass filter 8. An aperture device is constituted by a ND filter 11, aperture blades 12 and 13, which are moved to oppose each other, and an aperture blade support plate 14. The two aperture blades form a substantially rhombic aperture. The ND filter is normally adhered to one of the two aperture blades.

Figure 8:
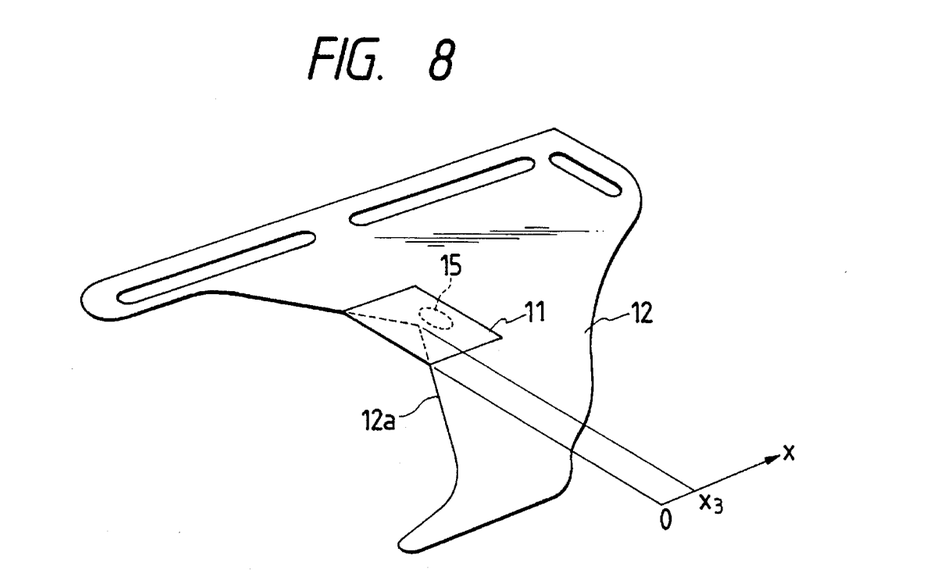
FIG. 8 is a perspective view of an aperture blade attached with the conventional ND filter.

In the conventional aperture device, as shown in FIG. 8, the ND filter 11 is adhered to the edge portion of an aperture portion 12a of the aperture blade 12 by an adhesive 15 to cover an aperture size as small as F8 to F11 so as to attain small-aperture correction. The conventional ND filter 11 adopts a uniform darkness filter.

In general, as a method of manufacturing a ND filter, a method of mixing and kneading a light absorbing pigment in a film-like material (cellulose acetate. PET, or the like), and a method of coating a light absorbing pigment onto the material are available. With these manufacturing methods, a filter having a uniform darkness can be manufactured. However, it is very difficult to manufacture a filter whose darkness changes.

SUMMARY OF THE INVENTION

According to one aspect of the invention, an original, on which a plurality of darkness distributions having a predetermined relationship with a darkness distribution for ND-filtering transmission light at the position of an aperture blade in an aperture device are formed, is prepared, the original is photographed on a film by a camera, and after the film is developed, the film is molded to obtain a plurality of ND filters.

According to another aspect of the invention, an original having a darkness distribution for exhibiting different transmission rates depending on regions is prepared using a film having a transmission rate of 80% or more of a base, and provided with an anti-halation layer, the original is photographed on a film by a camera, and after the film is developed, the developed film is used as a ND filter.

According to still another aspect of the invention, an original having a predetermined darkness distribution is prepared using a film containing a diazo compound as a photosensitive material, the film is exposed using the original, and after the film is developed, the film is used as a ND filter.

DETAILED DESCRIPTION OF THE PREFERRED EMBODIMENTS

The darkness distribution in a ND filter is determined beforehand, and an original having a darkness distribution in a given enlarged scale is prepared. The original is preferably photographed by a micro-copy photographing device (camera), and is developed using a micro-copy developing device.

A micro-copy film formed as described above is directly used as a ND filter. Since the micro-copy film, and the micro-copy camera and developing device are used for copying a document, a filter can be finished to have a more uniform darkness than a filter formed by a normal camera using a normal photographing film. Thus, the micro-copy film is suitable for a filter. More specifically, as an important requirement for a ND filter, spectral characteristics are known. That is, the ND filter must exhibit a constant darkness (transmission rate) in a wavelength range between 400 nm and 650 nm. Of various films, a 35-mm film used in, e.g., a normal landscape photographing operation suffers from a large variation in spectral characteristics, and is often unsuitable for the ND filter.

In this respect, the micro-copy film has a good flatness, and a high resolving power. As another requirement, since light having a predetermined wavelength must be shielded at a predetermined darkness, a film is required to have a constant darkness regardless of positions. In addition, the film is required to always have a constant darkness from a photographing step to a development step regardless of an operation time period. For this reason, it is often difficult for the normal camera and developing device to meet these requirements.

The micro-copy photographing device comprises a special-purpose illumination system, and has the following advantages to meet the above-mentioned requirements. That is, illumination darkness nonuniformity is small, the lens resolving power for a predetermined objective distance is good, lens aberrations are small, the lens is bright, and so on.

The normal developing device suffers from a variation in darkness depending on the solution temperature and the time, whereas the micro-copy developing device has small darkness nonuniformity.

As an original used in a photographing operation, paper having a constant reflectance is used if a filter having a uniform darkness is to be manufactured. When a variable-darkness type filter is to be manufactured, an enlarged pattern is prepared using paper having different reflectances (called "gray scale") in consideration of the reduced scale. For example, if an A3-size paper sheet is used as an original, and is photographed on a film in a reduced scale, the scale falls within a range between ×8.5 and ×9.0. The number of filters per frame of a film is calculated, and variable-darkness patterns corresponding to the number of filters are formed on the paper. Thus, the paper is used as the original.

When the normal film, photographing device, and developing device used in a landscape photographing operation are used, density nonuniformity easily occurs, and only the central portion of a frame of the film can be used. However, when the micro-copy film, photographing device, and developing device are used, many filters can be manufactured from one frame. The micro-copy film is more advantageous than the normal film with a base in a light chromatic color since it has a transparent base.

Figure 1:
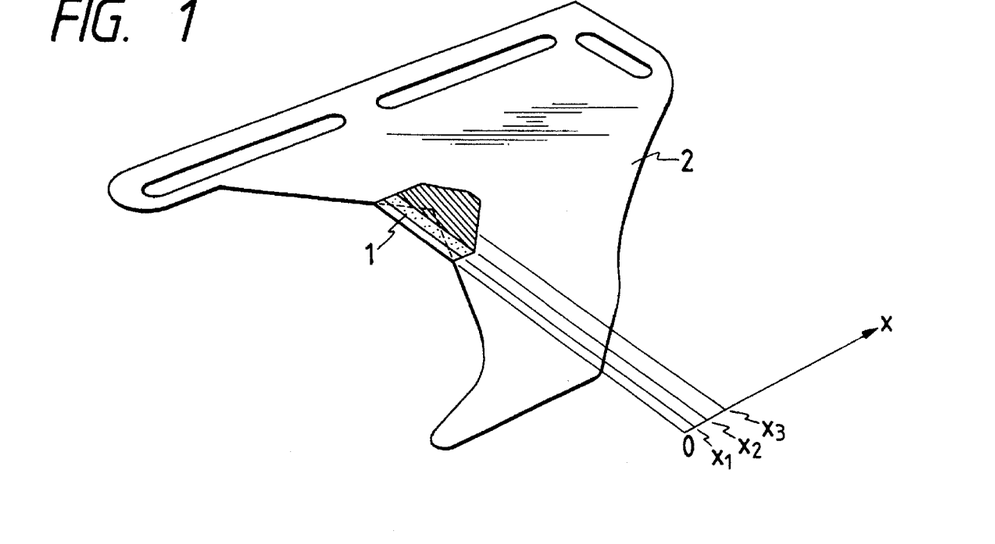
FIG. 1 is a perspective view showing the first embodiment of the present invention.
Figure 2:
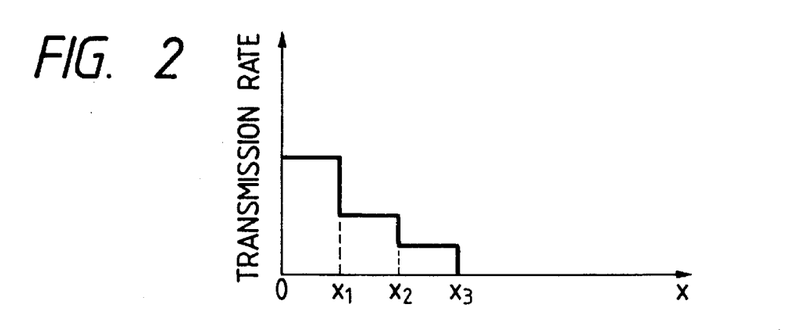
FIG. 2 is a graph showing transmission rate characteristics of a ND filter in FIG. 1.

FIG. 1 illustrates one of two aperture blades. A ND filter 1 according to the first embodiment of the present invention is adhered to an aperture blade 2 to cover a recessed notched portion of the aperture blade 2. The ND filter 1 has transmission rates which change stepwise between positions 0 and $x_1$, between positions $x_1$ and $x_2$, and after a position $x_3$, as shown in FIG. 2. Note that the direction of the x-coordinate corresponds to a direction separated away from the optical axis of a photographing optical system.

Figure 3:
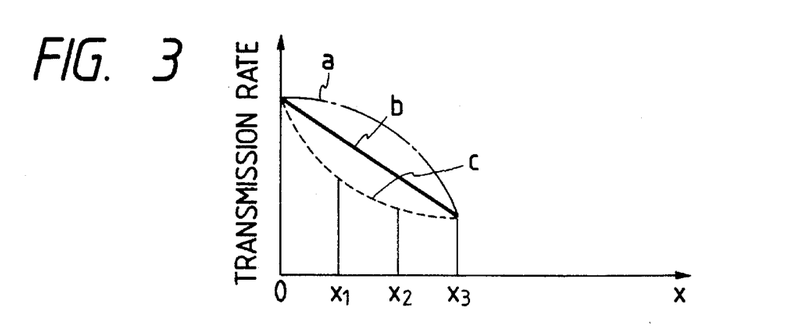
FIG. 3 is a graph showing another transmission rate characteristics.

A change in transmission rate may be continuous, as shown in FIG. 3. In this case, it is preferable to select one of various characteristic curves a, b, and c according to characteristics required for a camera.

Figure 4:
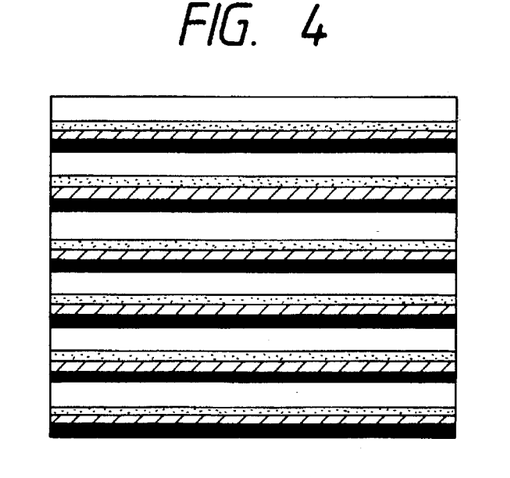
FIG. 4 is a front view of an original in the first embodiment.

In this embodiment, in order to form a pattern having a change in transmission rate shown in FIG. 2 on a 34-mm micro-copy film, an A3-size original was prepared. FIG. 4 illustrates the state of the original, and a plurality of lines of patterns having the same change in transmission rate are drawn on the original. In this embodiment, the original was prepared using paper called "gray scale". However, various other methods are available.

When the original is photographed using a micro-copy camera, the patterns on the original are printed on a film in a reduced scale. The reduced ratio can be calculated from the required size of the filter, and is ×1/8.5 in this embodiment.

Then, conditions are set so that the exposure time and illumination intensity in a photographing operation match with the transmission rate of the film. With the above-mentioned film, about 500 frames could be photographed under the same conditions. The photographed film was then developed using a micro-copy automatic developing device. In this case, the film can be developed under the same conditions by appropriately setting the solution temperature and the moving time of the film, resulting in convenience.

Figure 5:
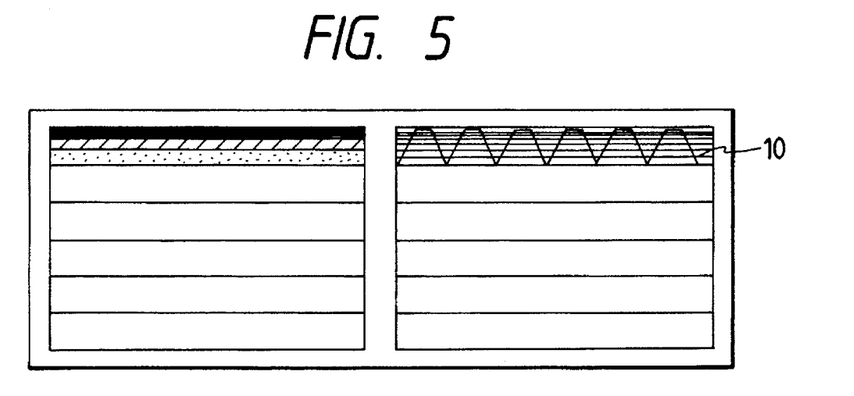
FIG. 5 is a partial view of a developed film.
Figure 6:
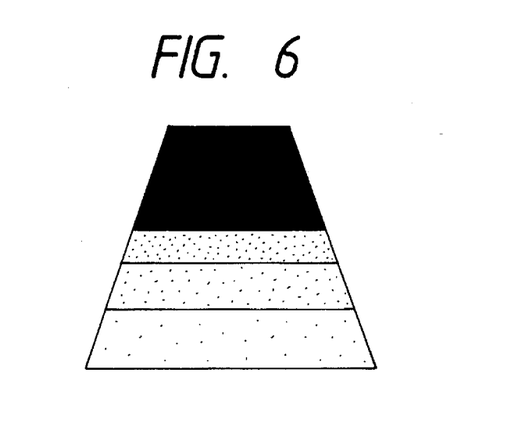
FIG. 6 is a front view of the ND filter according to the first embodiment.

After the film is developed, patterns having reversed black and white portions of the original are formed since a negative film is used. FIG. 5 illustrates only one line of a transmission rate distribution for the sake of simplicity. However, assume that the patterns are formed on the entire film surface in practice. The film is punched by a press in the form of a trapezoid 10, as illustrated at the right side in FIG. 5, and the punched patterns are molded, thereby obtaining ND filters whose darkness changes, as shown in FIG. 6.

Note that filters having a constant transmission rate can be manufactured following substantially the same procedures as described above except that paper having a constant reflectance is used for an original.

According to the embodiment described above, a large number of ND filters having a predetermined darkness distribution can be easily provided. When the ND filter is used in an aperture device of a photographing system, a photographing operation can be satisfactorily performed for a high-luminance object.

The ND filter of this embodiment is very advantageous in terms of performance and cost as compared to kneading type and coating type ND filters.

Furthermore, since the micro-copy camera is used, the entire film surface has equivalent quality, and can be efficiently used for ND filters.

In the second embodiment of the present invention, a darkness distribution (an opposite darkness distribution is used since it is reversed) corresponding to a predetermined darkness distribution of a ND filter is formed, and an original is prepared by enlarging the darkness distribution in a given enlarged scale. Then, the original is photographed by a camera using a film satisfying specific conditions, and the photographed film is developed.

The developed film is molded (punched), and the molded film is used as a ND filter.

A pattern is formed on the original, so that a direction perpendicular to a direction in which the reflection darkness changes has a uniform reflection darkness, and many predetermined filters can be formed within one frame (effective area=29 mm×41 mm max) of the film. Note that the reflection darkness distribution of the original is one obtained by reversing black and white portions of a darkness distribution shown in FIGS. 9A and 9B (to be described later).

As characteristics required for the ND filter, the light-shielding amount (transmission rate) must be constant at the same position in the filter. An allowable variation on this quality must fall within a range of an average value of ±15% (8.5 to 11.5% when the transmission rate=10%) (±0.05% in darkness). The relationship between a darkness D and a transmission rate T is given by $D=0.78 \times \log_{10} 1/T$.

In a photograph method of this embodiment, when white paper having a high reflectance is photographed, a high-darkness portion is formed, and when black paper having a low reflectance is photographed, a low-darkness portion is obtained. The darkness distribution is printed on a film from a black-white reversed original pattern.

Figure 13:
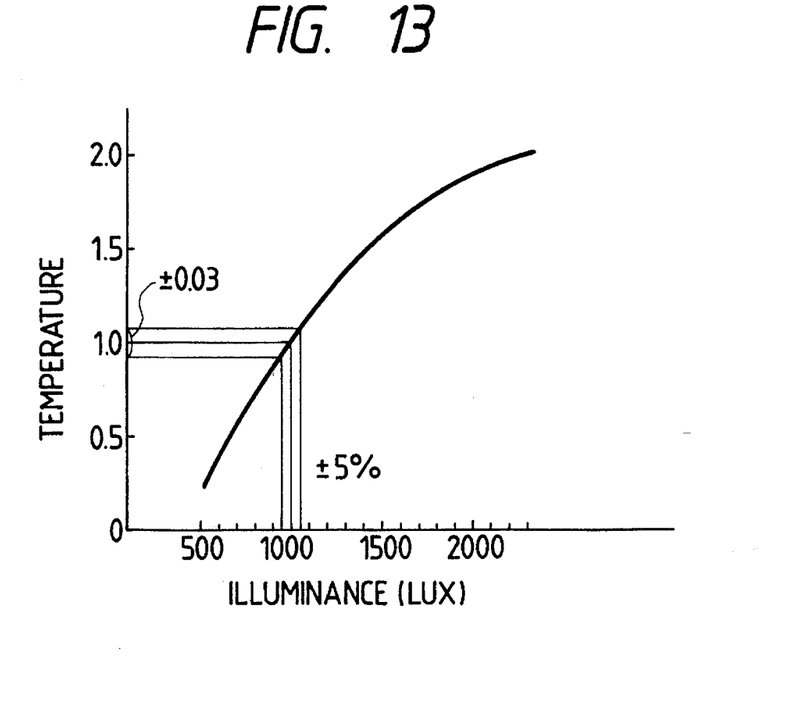
FIG. 13 is a graph showing illuminance curves upon photographing.

Since the darkness distribution is determined by this chemical change, conditions in photographing and development operations must be properly set so as to obtain a uniform darkness in the film. For example, in the photographing operation, an illumination must be carefully controlled, and a variation in illuminance must fall within a range of ±5%, as shown in FIG. 13.

Furthermore, a photographing reduced scale properly falls within a range between 1/5 and 1/15.

When the reduced scale becomes smaller than 1/15 (e.g., 1/24), darkness nonuniformity is increased, and falls outside the above-mentioned allowable range of 15%. When the reduced scale becomes larger than 1/5, the original size is decreased, and the resolving power (of a change in darkness) is undesirably lowered.

Figure 15:
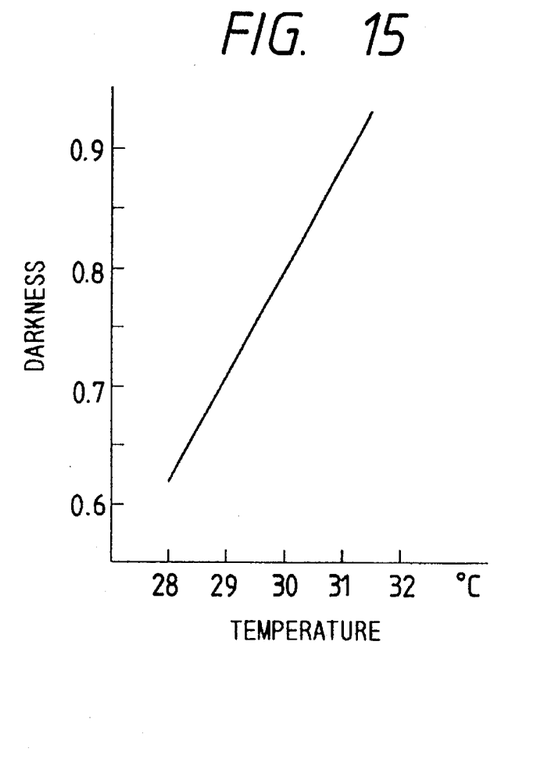
FIG. 15 is a graph showing the relationship between the solution temperature and the film darkness.

A variation in solution temperature in a development operation is controlled to fall within a range of ±0.3°° C. The solution temperature and the film darkness have a relationship shown in FIG. 15 therebetween.

As another characteristics required for the filter, the transmission rate must be constant in a wavelength range between 400 nm and 650 nm. When the reflectance exceeds 10%, it causes a ghost phenomenon, and such a filter cannot be used. Furthermore, the resolving power is preferably as high as possible. Moreover, the darkness of the brightest portion must be low (since the range of a change in darkness can be widened).

Figure 14:
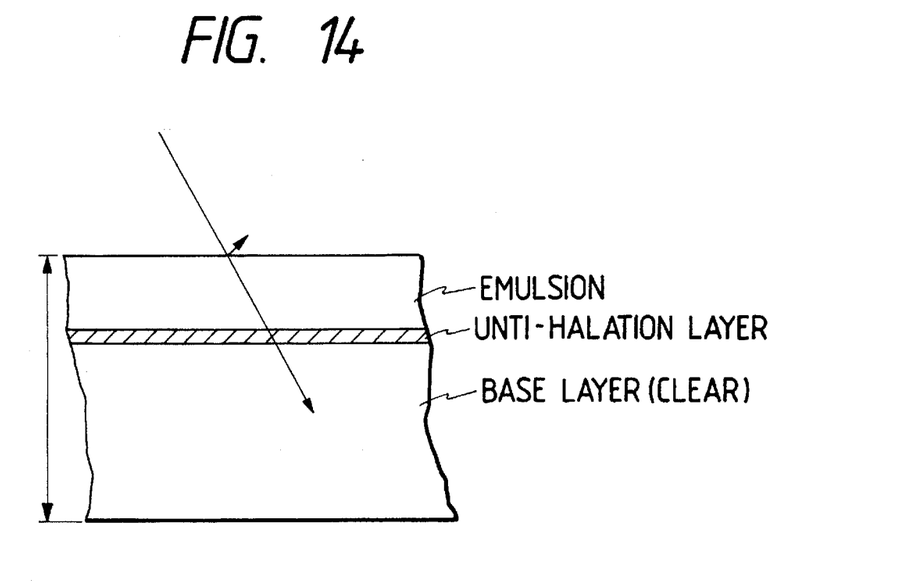
FIG. 14 is a sectional view showing an anti-halation layer of a film.

From the above-mentioned requirements, the film must satisfy:

① the particle size of a silver chloride particle is 0.5 μm or less;

② an anti-halation layer must be formed (see FIG. 14);

③ spectral transmission characteristics must fall within a range of ±20% (a ratio to an average value) in a wavelength range between 400 nm to 650 nm; and ④ the base of the film must have a transmission rate of 80% or more.

The most important requirements for the ND filter are the transmission rate of the base and the presence/absence of the anti-halation layer.

Figure 12:
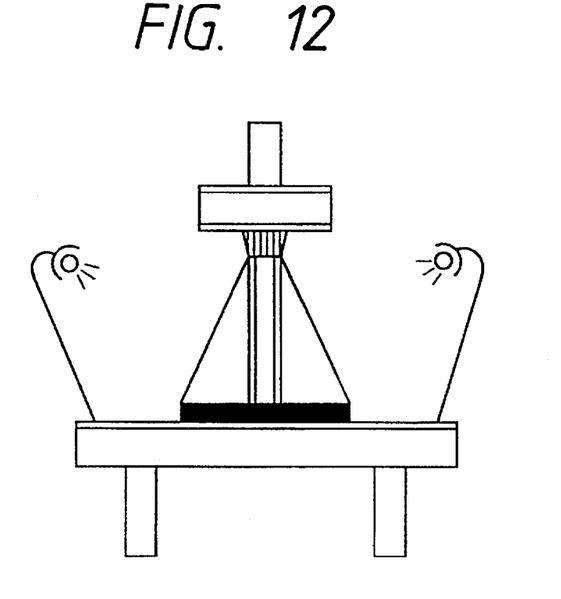
FIG. 12 is an explanatory view showing a photographing method according to the second embodiment of the present invention.

As a camera, a flat-bottom type copy camera was used, as shown in FIG. 12. This camera was selected in consideration of the resolving power.

As a developing device, a copy automatic developing device was selected.

A state after the original is photographed by the camera using a film satisfying the above-mentioned conditions will be described below.

Figure 9A:
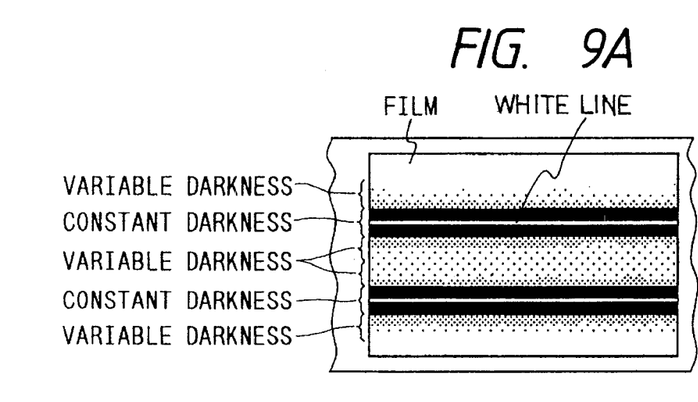
FIGS. 9A and 9B are views showing a developed film used as the ND filter of the first embodiment.
Figure 9B:
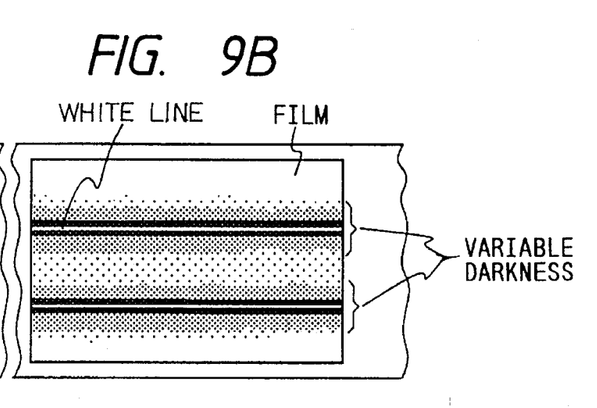

FIGS. 9A and 9B show the developed film after the photographing operation.

Figure 10A:
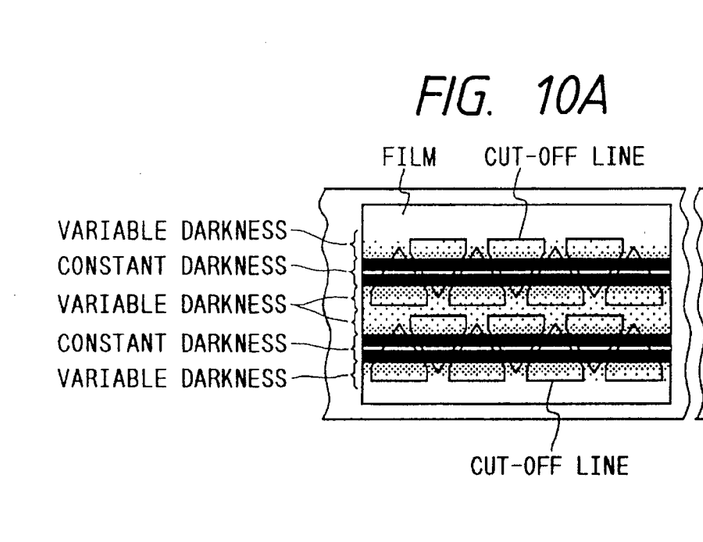
FIGS. 10A and 10B are views showing a method of cutting the film shown In FIG. 9.
Figure 11:
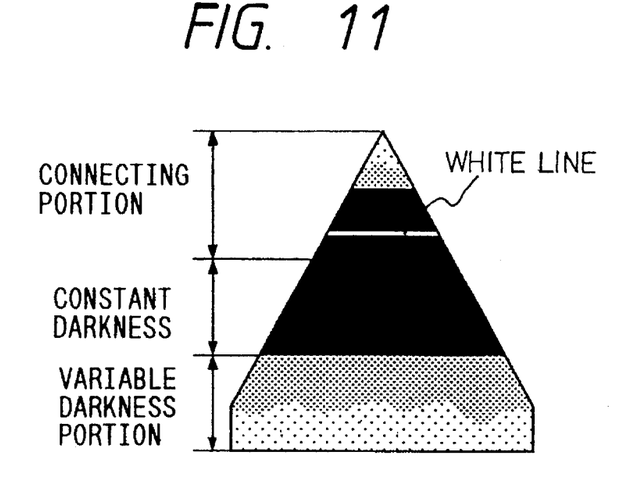
FIG. 11 is an enlarged view of the cut ND filter.

FIG. 9A shows the first example. In this example, a constant-darkness region is contiguous with a variable-darkness region where the darkness is gradually decreased. When the film is cut along cut-off lines shown in FIG. 10A, a large number of ND filters (FIG. 11 is an enlarged view thereof) can be obtained. As can be seen from FIGS. 9A and 10A, a darkness distribution pattern from which two staggered lines of substantially triangular ND filters can be cut is formed on the film. In this case, the way of forming the darkness distribution pattern which allows one to alternately cut many ND filters from the film is most important; variable-darkness regions where the darkness is gradually decreased are formed above and below (in FIG. 11) the central constant-darkness region. Thus, as shown in the enlarged view of FIG. 11, a cut ND filter has variable-darkness regions not only at its lower position (in FIG. 11) but also at its upper position (in FIG. 11). However, since the variable-darkness region at the upper position is used as a connecting portion 15 to an aperture blade 12, no problem is posed.

In the ND filter shown in FIG. 11, a white line as an index for accurately determining a mounting position to the aperture blade 12 is formed in the region of the connecting portion 15 (of course, the line is formed in the original). When the filter is adhered while aligning this white line with a specific position of the aperture blade, the mounting position can be very accurately obtained.

Figure 10B:
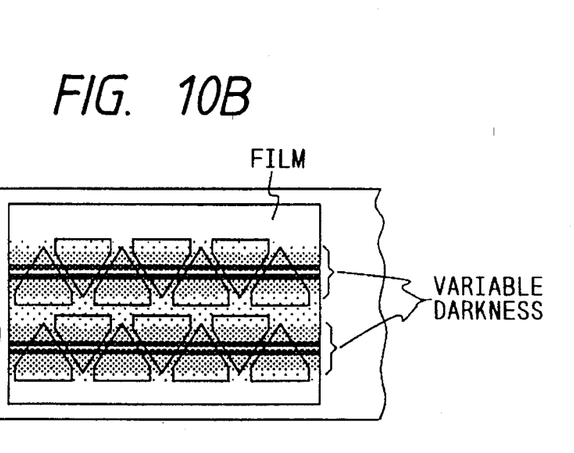

FIG. 9B shows the second example. In this example, a variable-darkness region is formed on the entire surface of the film. When the film is cut, as shown in FIG. 10B, a large number of ND filters can be obtained. In the second example, the darkness distribution pattern is formed on the film, so that two staggered lines of ND filters can also be obtained, as shown in FIG. 10B. In addition, a white line as an index for accurately determining the mounting position is also formed like in the first example.

The effects in use of the ND filter formed in the first example shown in FIGS. 9A and 10A will be explained below.

Although no problem is posed in a conventional ND filter having a uniform darkness, when the ND filter has a change in darkness, the effective aperture value in a small aperture size may vary depending on the camera. In the case of a video camera, when an object field has a given brightness or higher, the aperture is fixed at the minimum aperture size, and is no longer stopped down since the resolving power is lowered in a certain aperture size or less. For this reason, in an outdoor photographing operation, which most requires the ND filter, a probability that the aperture is controlled to have the minimum aperture size is increased. In the ND filter having a constant-darkness region as in the first example, however, since only the constant-darkness region is located inside the aperture in the minimum aperture size, the effective value in the small aperture size can be prevented from varying depending on the camera.

The characteristics of the ND filters shown in FIGS. 9A and 9B and FIGS. 10A and 10B will be described below.

Figure 16:
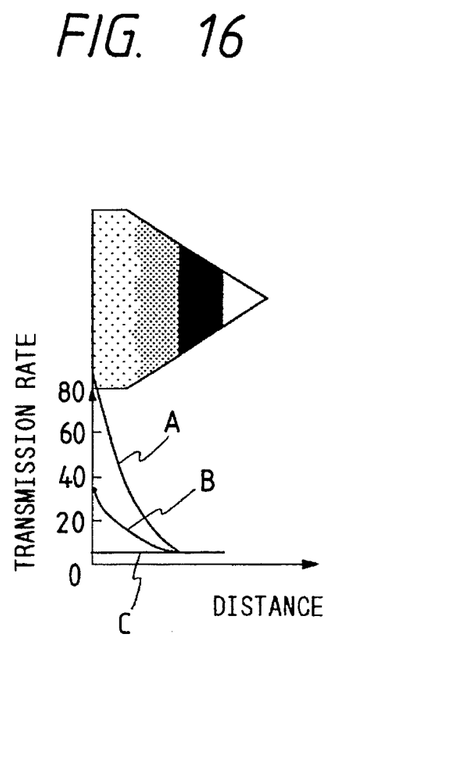
FIG. 16 is a graph showing changes in transmission rates of three different ND filters.

FIG. 16 shows a difference of transmission rates among three different filters. In FIG. 16, a curve A represents the ND filter in the first example of this embodiment, a curve B represents a ND filter which is formed using a normal film (e.g., a 35-mm film) different from that of this embodiment to have a distribution of the first example, and a curve C represents a ND filter having a constant darkness. The ND filter A has a transmission rate of about 5% at a constant darkness. In this filter, the transmission rate is gradually changed, and the maximum transmission rate exceeds 80%. This is because the transmission rate of the film base itself exceeds 80%. On the other hand, the ND filter B has a transmission rate of about 5% at a constant darkness like in the filter A. However, the maximum transmission rate of this filter is slightly lower than 40%. This is because the transmission rate of the film base itself is low. Note that the ND filter C has a constant darkness (about 5%).

Figure 17:
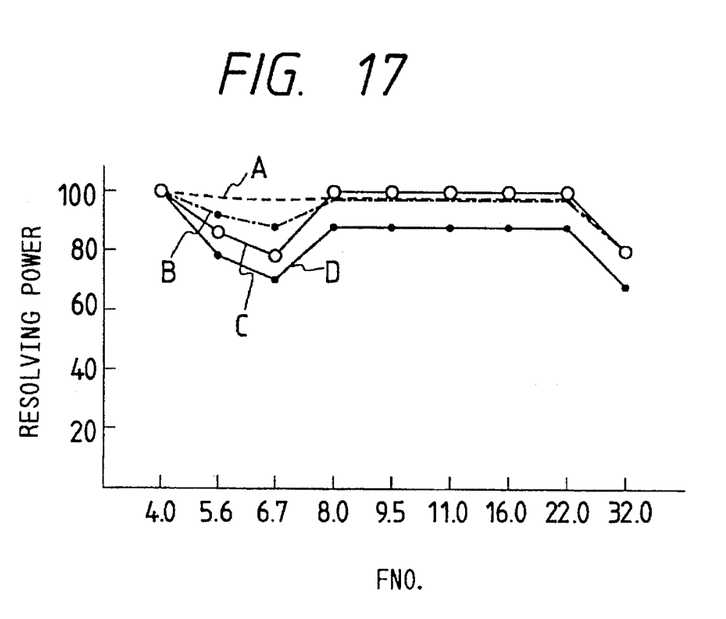
FIG. 17 is a graph showing resolving powers of four different ND filters.

FIG. 17 shows the resolving powers of the above-mentioned three different ND filters. As can be seen from FIG. 17, the three filters have different resolving powers in an $F_{NO}$ range between 4.0 and 8.0 on the basis of a difference of their transmission rates. More specifically, as can be understood from FIG. 17, only the ND filter A of this embodiment can obtain a high resolving power. In FIG. 17, in the ND filters A to C, the silver chloride particle size of the base film experimentally falls within a range between 0.2 μm and 0.5 μm. In a ND filter D shown in FIG. 17, the silver chloride particle size of a base film having the same transmission rate as that of the ND filter B falls within a range between 1 μm and 5 μm. As can be seen from FIG. 17, the resolving power of the ND filter D is lower than the ND filter B.

The effect of the presence of the anti-halation layer as one of the conditions of the film of this embodiment will be explained below.

When the ND filter is used in a video lens, as shown in FIG. 7, object light transmitted through a photographing optical system (lenses 6A to 6D) is incident on an imaging element 7, whereas some light components of the object light are reflected by the surface of the imaging element 7. When these reflected light components are re-reflected by the rear surface of the ND filter, they are re-incident on the imaging element 7 as ghost components. When the film base with the anti-halation layer is used like in this embodiment, irregular reflection can be minimized, and a ghost phenomenon can be prevented.

According to the second embodiment, the ND filter used in an aperture device, and having different transmission rates depending on regions can be easily manufactured as follows. That is, an original formed with a reflection darkness distribution, which varies depending on regions, is photographed by a camera using a film whose base has a transmission rate of 80% or more, and provided with an anti-halation layer, and after the film is developed, it is used as the ND filter. In addition, the resolving power can be increased, and the problem with the ghost phenomenon can be solved.

The third embodiment of the present invention will be described below.

In the third embodiment, as a film used as a ND filter, a diazo film is used. The diazo film has a sensitivity inferior to that of a silver chloride film, and has an ISO sensitivity inferior to that of the silver chloride film $10^{-4}$ times. For this reason, with a method of photographing an original having a predetermined reflection darkness to expose the diazo film in the same manner as for the silver chloride film, as shown in FIG. 12, light energy becomes insufficient. In addition, since an ultraviolet ray, which optically reacts with a diazo compound, is used as photographing light, a structure for shielding the ultraviolet ray harmful for a human body is required in the method shown in FIG. 12, and the apparatus becomes large.

Therefore, in the third embodiment, a developed silver chloride film is used as an original, and the silver chloride film and a non-exposed diazo film are stacked to be in direct contact with each other. Then, an ultraviolet ray is radiated to be transmitted through both the films, thereby exposing the diazo film.

As the diazo film, a duplicate film prepared by coating a sensitive diazonium salt and a coupler (coloring agent) as main agents on a transparent triacetate or polyester support member was used. The diazo film has a sensitive wavelength range of about 350 nm to 450 nm, and the maximum sensitive wavelength is obtained near 380 nm. Therefore, as an exposure light source, a high-pressure mercury lamp or an ultraviolet fluorescent lamp for radiating an ultraviolet ray is used.

Figure 18:
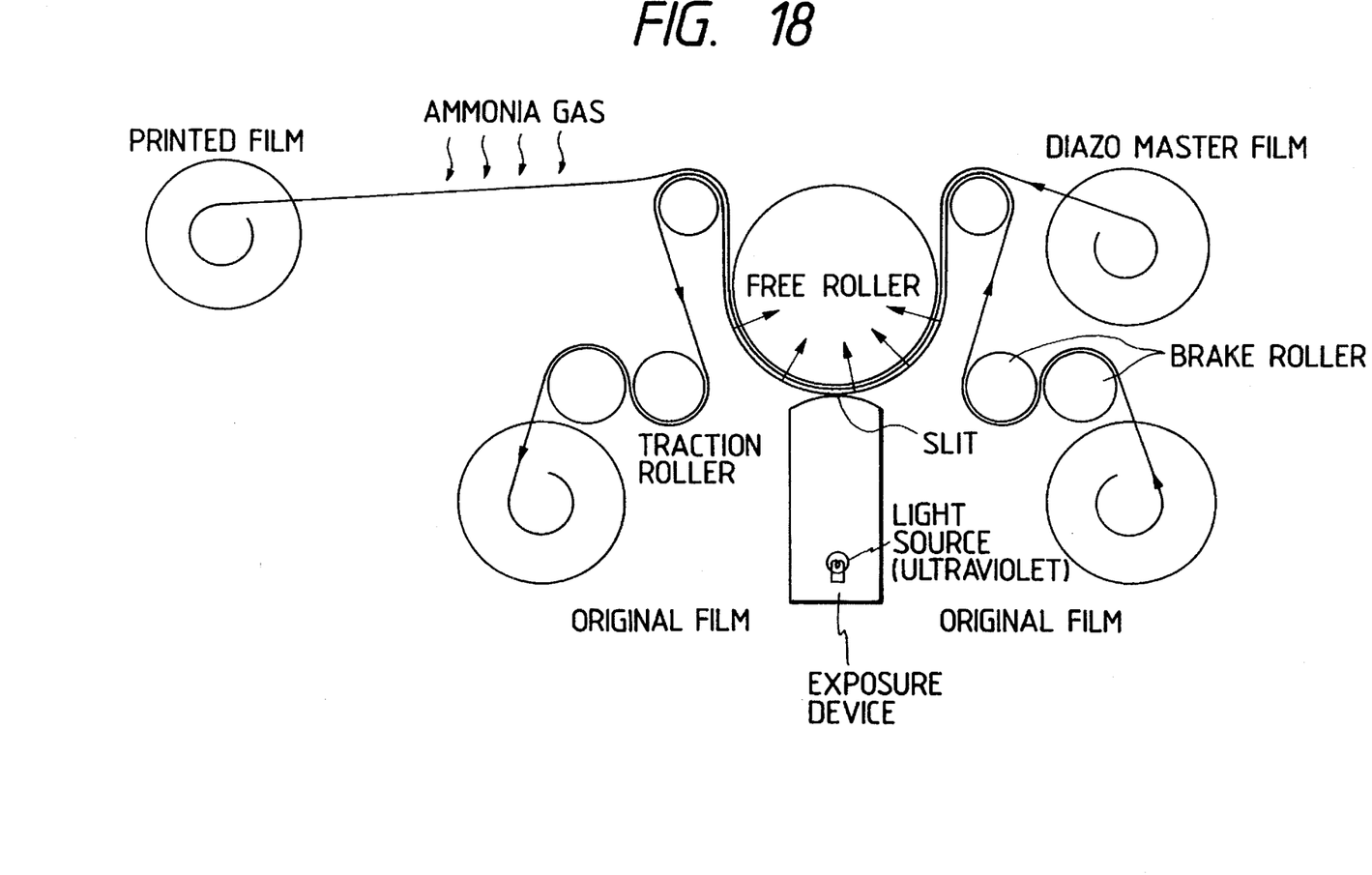
FIG. 18 is a view showing an image forming process according to the third embodiment of the present invention.

FIG. 18 shows an image forming process using the diazo film. In FIG. 18, an original film corresponds to one shown in FIG. 9A (or 9B) in the second embodiment. Note that the original film has a darkness distribution used as an actual ND filter in place of a darkness distribution whose black and white portions are reversed. The original film is stacked on a diazo master film by a free roller to be in contact with each other, and an ultraviolet ray emitted from a light source is transmitted through the films at the slit position in an exposure device, thereby exposing the diazo master film. More specifically, when the diazo film is exposed by the ultraviolet ray, the diazonlum salt irradiated with the ultraviolet ray is decomposed, and generates an inert colorless material, which does not react with the coupler. The non-decomposed diazonlum salt, which is not irradiated with the ultraviolet ray, is developed by ammonia gas in the next process, reacts with the coupler, and generates a diazo dye, thus forming a color-developed image. Therefore, a printed film having the same darkness distribution as that of the original film is consequently formed. Thereafter, the printed film is cut along cut-off lines shown in FIG. 10A (or 10B), thereby obtaining a large number of ND filters.

The image characteristics of the ND filter formed of the diazo film have a high resolving power and less light scattering since an image is formed by dye molecules (about 20 Å; 0.002 μm) considerably smaller than silver halide particles.

Figure 19:
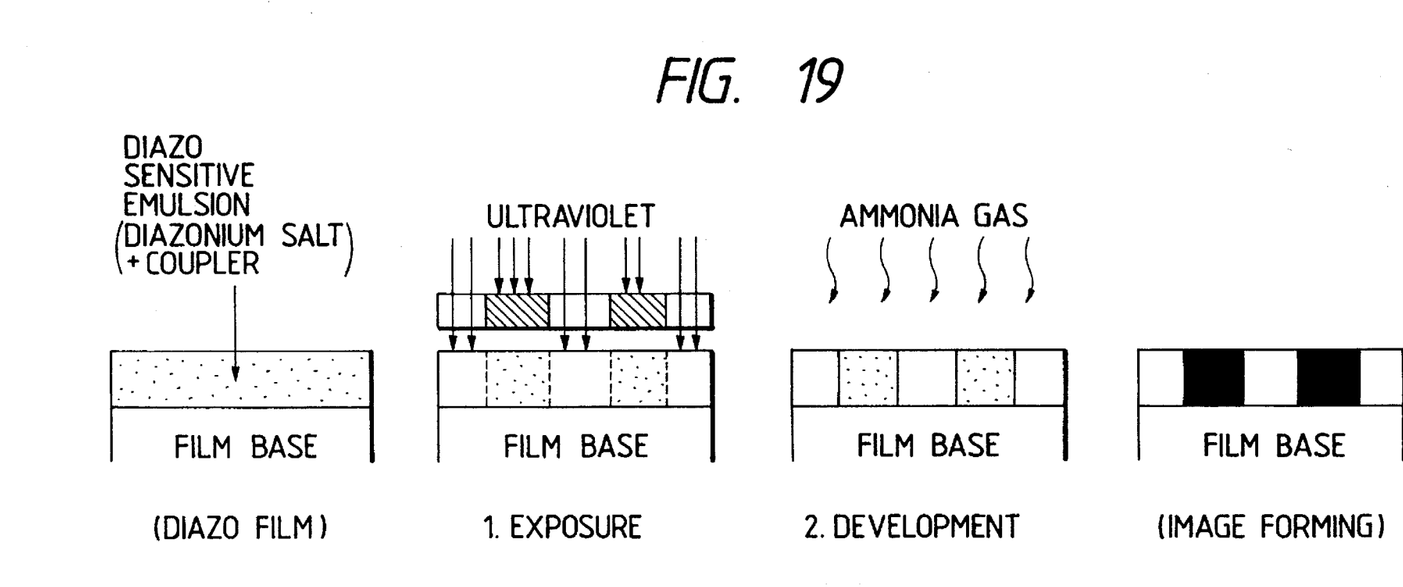
FIG. 19 is a view showing the principle of the image forming process.

As a reference, FIG. 19 shows the principle of image formation on the diazo film. Note that the diazo film includes blue development type and black development type. In this case, the black development type film is suitable for a ND filter since it has a high contrast and its base film has a low darkness. In this embodiment, a black development type diazo film was used.

Figure 20:
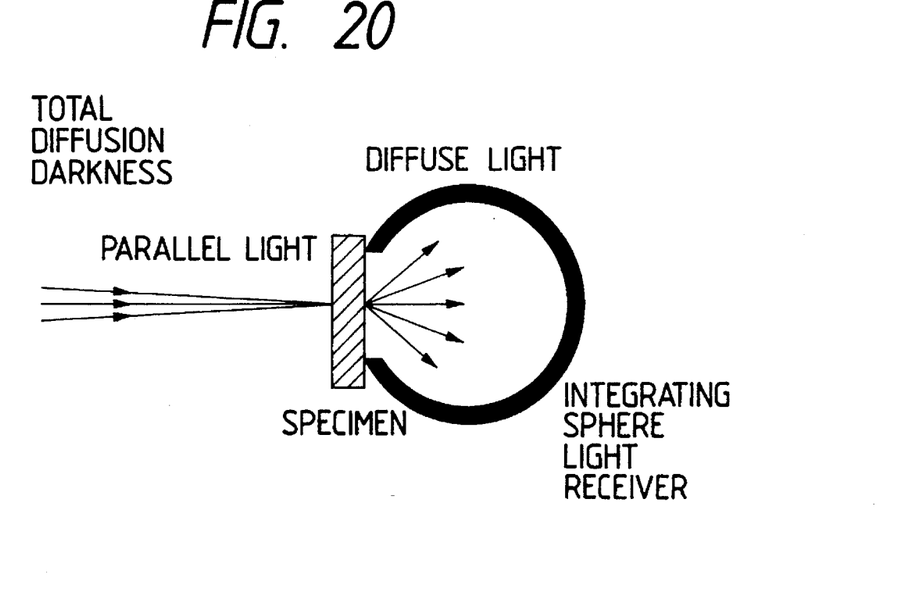
FIG. 20 is a view showing a method of measuring diffuse light.
Figure 21:
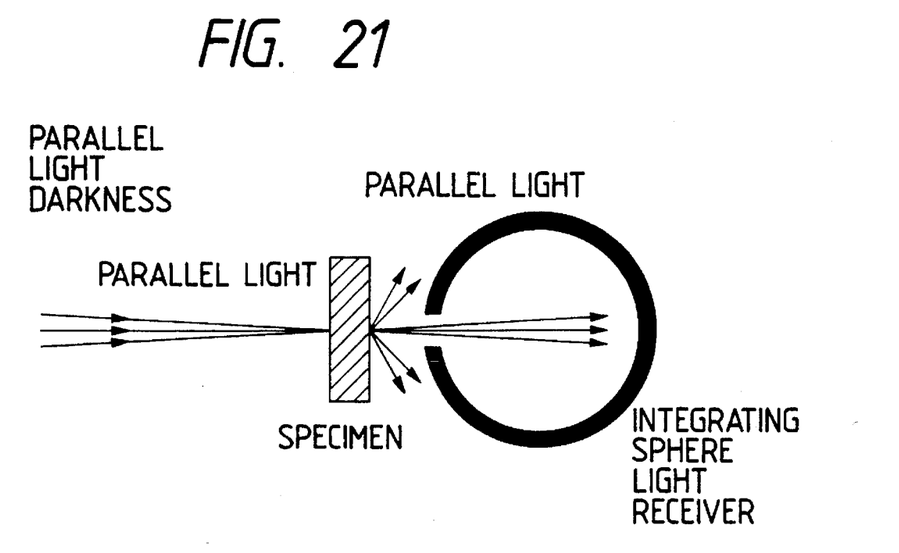
FIG. 21 is a view showing a method of measuring parallel light.

The diazo film causes less light scattering than the silver chloride film. As a method of measuring scattered light, a total diffusion darkness ($D_D$) is obtained by radiating parallel light onto a film, and measuring light transmitted through the film by an integrating sphere light receive, as shown in FIG. 20, and a parallel light darkness ($D_P$) is obtained by radiating parallel light onto a film, and measuring only parallel light components transmitted through the film by an integrating sphere light receive, as shown in FIG. 21. Then, the ratio ($D_P/D_D$) of the two darknesses is calculated. If the ratio is close to 1, it is determined that the amount of scattered light is small; if the ratio exceeds 1, it is determined that the amount of scattered light is increased.

In a silver chloride particle (0.3 μm to 0.4 μm) film, $D_P/D_D=1.35$, and in the diazo film, $D_P/D_D=1.05$. Therefore, the diazo film causes considerably less light scattering than the silver chloride film, and has superior scattered light characteristics as a ND filter to those of the silver chloride film. More specifically, a problem about deterioration of an image caused by scattered light can be advantageously solved using the diazo film.

What is claimed is:

1. An aperture device having a ND filter being attached to a moveable member for adjusting a light amount, said ND filter being formed to have different transmission rates depending on regions, said ND filter being formed from a developed film on which an original having a reflection darkness distribution having a predetermined relationship with said different transmission rates has been photographed by a camera, said film comprising a base having a transmission rate of not less than 80%, and an anti-halation layer, wherein said ND filter movably interlocks with a movable aperture member.

2. A device according to claim 1, wherein said film has a silver chloride particle size of not more than 0.5 μm.

3. A device according to claim 2, wherein said film has transmission spectral characteristics such that a variation in transmission rate in a wavelength range between 400 nm and 650 nm is not more than 20% as a ratio of a minimum transmission rate to a maximum transmission rate.

4. A device according to claim 1, wherein said film has transmission spectral characteristics such that a variation in transmission rate in a wavelength range between 400 nm and 650 nm is not more than 20% as a ratio of a minimum transmission rate to a maximum transmission rate.

5. A device according to claim 1, wherein a plurality of ND filter patterns are simultaneously photographed on said film, and the developed film is cut into a large number of ND filters.

6. A device according to claim 1, wherein said reflection darkness of said original is defined by connecting, in one direction, a constant-darkness region and a variable-darkness region in which a darkness is gradually lowered from the constant darkness.

7. A device according to claim 1, wherein a mark indicating a mounting position to an aperture blade after said film is cut in the form of said ND filter is formed on said ND filter on said film.

8. An aperture device having a ND filter being attached to a moveable member for adjusting a light amount, said ND filter comprising:

an original having a darkness distribution having a predetermined relationship with a darkness distribution for providing a ND filtering function; and a diazo film exposed with an ultraviolet ray representing said darkness distribution of said original, wherein said diazo film is developed and said developed film is cut in a form of a plurality of ND filters having the same density distribution.

9. A device according to claim 8, wherein a width of said ND filter is decreased in a direction in which a darkness is increased.

10. A device according to claim 8, wherein a plurality of lines of darkness distribution regions are formed on said original, a plurality of lines of darkness distribution regions are also formed on said developed film, and a large number of ND filters are obtained by cutting said film in units of lines of said plurality of lines of darkness distribution regions.

11. A device according to claim 10, wherein said darkness distribution is formed, so that a transmission rate of said ND filter changes stepwise.

12. A device according to claim 10, wherein said darkness distribution is formed, so that a transmission rate of said ND filter changes gradually.

13. A device according to claim 8, wherein said darkness distribution is formed, so that a transmission rate of said ND filter changes stepwise.

14. A device according to claim 8, wherein said darkness distribution is formed, so that a transmission rate of said ND filter changes gradually.

15. An aperture device in which a ND filter is attached to an aperture blade, said ND filter being arranged by a method comprising the steps of:

preparing an original having a darkness distribution having a predetermined relationship with a darkness distribution for providing a ND filtering function;

exposing a film with light representing said darkness distribution of said original;

developing said exposed film; and cutting said developed film in a form of said ND filter, said cutting step including the step of obtaining a plurality of said ND filters having the same density distribution, wherein a width of said ND filter is decreased in a direction in which a darkness is increased.

16. A device according to claim 15, wherein variable-darkness paper sheets having different reflectances are used for preparing said original.

17. A device according to claim 15, wherein a plurality of lines of darkness distribution regions are formed on said original, a plurality of lines of darkness distribution regions are also formed on said developed film, and a large number of ND filters are obtained by cutting said film in units of lines of said plurality of lines of darkness distribution regions.

18. An aperture device according to claim 15, wherein a diazo film is used as said film.

19. An aperture device according to claim 15, wherein said film comprises a base having a transmission rate of not less than 80%, and an anti-halation layer.

20. An aperture device in which a ND filter is attached to an aperture blade, said ND filter being arranged by a method comprising the steps of:

preparing an original having a darkness distribution having a predetermined relationship with a darkness distribution for providing a ND filtering function;

exposing a film with light representing said darkness distribution of said original;

developing said exposed film; and cutting said developed film in a form of said ND filter, said cutting step including the step of obtaining a plurality of said ND filters having the same density distribution, wherein said darkness distribution is formed so that a transmission rate of said ND filter changes stepwise.

21. A device according to claim 20, wherein variable-darkness paper sheets having different reflectances are used for preparing said original.

22. A device according to claim 20, wherein a plurality of lines of darkness distribution regions are formed on said original, a plurality of lines of darkness distribution regions are also formed on said developed film, and a large number of ND filters are obtained by cutting said film in units of lines of said plurality of lines of darkness distribution regions.

23. An aperture device according to claim 20, wherein a diazo film is used as said film.

24. An aperture device according to claim 20, wherein said film comprises a base having a transmission rate of not less than 80%, and an anti-halation layer.

25. An aperture device in which a ND filter is attached to an aperture blade, said ND filter being arranged by a method comprising the steps of:

preparing an original having a darkness distribution having a predetermined relationship with a darkness distribution for providing a ND filtering function;

exposing a film with light representing said darkness distribution of said original;

developing said exposed film; and cutting said developed film in a form of said ND filter, said cutting step including the step of obtaining a plurality of said ND filters having the same density distribution, wherein said darkness distribution is formed so that a transmission rate of said ND filter changes gradually.

26. A device according to claim 25, wherein variable-darkness paper sheets having different reflectances are used for preparing said original.

27. A device according to claim 25, wherein a plurality of lines of darkness distribution regions are formed on said original, a plurality of lines of darkness distribution regions are also formed on said developed film, and a large number of ND filters are obtained by cutting said film in units of lines of said plurality of lines of darkness distribution regions.

28. A device according to claim 27, wherein said darkness distribution is formed so that a transmission rate of said ND filter changes gradually.

29. An aperture device according to claim 25, wherein a diazo film is used as said film.

30. An aperture device according to claim 25, wherein said film comprises a base having a transmission rate of not less than 80%, and an anti-halation layer.

31. An aperture device in which a ND filter is attached to an aperture blade, said ND filter being arranged by a method comprising the steps of:

preparing an original having a darkness distribution having a predetermined relationship with a darkness distribution for providing a ND filtering function;

photographing said original by a camera to expose micro-copy film;

developing said exposed film; and cutting said developed film in a form of said ND filter, wherein a width of said ND filter is decreased in a direction in which a darkness is increased.

32. A device according to claim 31, wherein variable-darkness paper sheets having different reflectances are used for preparing said original.

33. An aperture device in which a ND filter is attached to an aperture blade, said ND filter being arranged by a method comprising the steps of:

preparing an original having a darkness distribution having a predetermined relationship with a darkness distribution for providing a ND filtering function;

photographing said original by a camera to expose a micro-copy film;

developing said exposed film; and cutting said developed film in a form of said ND filter, wherein a plurality of lines of darkness distribution regions are formed on said original, a plurality of lines of darkness distribution regions are also formed on said developed film, and a large number of ND filters are obtained by cutting said film in units of lines of said plurality of lines of darkness distribution regions.

34. A device according to claim 33, wherein variable-darkness paper sheets having different reflectances are used for preparing said original.

35. An aperture device in which a ND filter is attached to an aperture blade, said ND filter being arranged by a method comprising the steps of:

preparing an original having a darkness distribution having a predetermined relationship with a darkness distribution for providing a ND filtering function;

photographing said original by a camera to expose a micro-copy film;

developing said exposed film; and cutting said developed film in a form of said ND filter, wherein said darkness distribution is formed, so that a transmission rate of said ND filter changes stepwise.

36. A device according to claim 35, wherein variable-darkness paper sheets having different reflectances are used for preparing said original.

37. An aperture device in which a ND filter is attached to an aperture blade, said ND filter being arranged by a method comprising the steps of:

preparing an original having a darkness distribution having a predetermined relationship with a darkness distribution for providing a ND filtering function;

photographing said original by a camera to expose a micro-copy film;

developing said exposed film; and cutting said developed film in a form of said ND filter, wherein said darkness distribution is formed, so that a transmission rate of said ND filter changes gradually.

38. A device according to claim 37, wherein variable-darkness paper sheets having different reflectances are used for preparing said original.

* * * * *

UNITED STATES PATENT AND TRADEMARK OFFICE
CERTIFICATE OF CORRECTION

PATENT NO. : 5,479,298
DATED : December 26, 1995
INVENTOR(S) : MICHIO YANAGI, et al.

It is certified that error appears in the above-indentified patent and that said Letters Patent is hereby corrected as shown below:

IN THE DRAWINGS

Sheet 6

Figure 14, "UNTI-HALATION" should read --ANTI-HALATION--.

COLUMN 1

Line 34, "light t," should read --light a,--.

COLUMN 2

Line 47, "In" should read --in--.

COLUMN 3

Line 27, "of ten" should read --often--.

COLUMN 5

Line 45, "characteristics" should read --characteristic--.

UNITED STATES PATENT AND TRADEMARK OFFICE
CERTIFICATE OF CORRECTION

PATENT NO. : 5,479,298  Page 2 of 2
DATED : December 26, 1995
INVENTOR(S) : MICHIO YANAGI, et al.

It is certified that error appears in the above-indentified patent and that said Letters Patent is hereby corrected as shown below:

COLUMN 8

Line 29, "diazonlum" should read --dizonium--.
Line 32, "diazonlum" should read --dizonium--.
Line 56, "receive," should read --receiver,--.
Line 60, "receive," should read --receiver,--.

Signed and Sealed this

Second Day of April, 1996

BRUCE LEHMAN

Attest:

Attesting Officer   Commissioner of Patents and Trademarks